United States Patent
Tamiya et al.

(10) Patent No.: US 12,278,909 B2
(45) Date of Patent: Apr. 15, 2025

(54) SIGNATURE VERIFICATION SYSTEM, SIGNATURE APPARATUS, SIGNATURE VERIFICATION METHOD, AND PROGRAM

(71) Applicant: NEC Corporation, Tokyo (JP)

(72) Inventors: Hiroto Tamiya, Tokyo (JP); Batnyam Enkhtaivan, Tokyo (JP); Toshiyuki Isshiki, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 17/928,233

(22) PCT Filed: Jun. 2, 2020

(86) PCT No.: PCT/JP2020/021825
§ 371 (c)(1),
(2) Date: Nov. 28, 2022

(87) PCT Pub. No.: WO2021/245807
PCT Pub. Date: Dec. 9, 2021

(65) Prior Publication Data
US 2023/0224165 A1    Jul. 13, 2023

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/0869* (2013.01)

(58) Field of Classification Search
CPC .... H04L 9/0825; H04L 9/0869; H04L 9/3247
(Continued)

(56) References Cited

U.S. PATENT DOCUMENTS 6,108,783 A * 8/2000 Krawczyk ............. H04L 9/3236
                                                      713/180
6,292,897 B1 * 9/2001 Gennaro ................. H04L 9/321
                                                      713/180
(Continued)

FOREIGN PATENT DOCUMENTS

| JP | 2010-050760 A | 3/2010 |
| WO | 2009/028513 A1 | 3/2009 |
| WO | 2019/057810 A1 | 3/2019 |

OTHER PUBLICATIONS

Brzuska et al., Sanitizable Signatures: How to Partially Delegate Control for Authenticated Data, pp. 1-12 (2009) (Year: 2009).*
(Continued)

*Primary Examiner* — David P Zarka
(74) *Attorney, Agent, or Firm* — Michael Dryja

(57) ABSTRACT

A signature verification system includes: a signature apparatus configured to sign a first chameleon hash value, an unmodifiable part of the data, and a second chameleon hash value of an entirety of the data; a changing apparatus configured to change a public key for the changers of the temporary delegator to a public key for changers of an actual delegator, using a private key for the changers; a delegator changing apparatus configured to change a modifiable part of the data, using a private key for the changers of the actual delegator; and a verifying apparatus configured to verify the signature using the public key for the changers and the public key for the changers of the actual delegator.

8 Claims, 7 Drawing Sheets

PERSONAL DATA PROVIDER (SIGNER) — 10
INDIVIDUAL (CHANGER) — 20
PERSONAL DATA TRUST BANK (CHANGER OF DELEGATOR) — 30
PERSONAL DATA USER (VERIFIER) — 40

(58) Field of Classification Search
USPC .......................................................... 713/168
See application file for complete search history.

(56) References Cited

U.S. PATENT DOCUMENTS

| | | |
|---|---|---|
| 2009/0138718 A1 | 5/2009 | Chevallier-Mames |
| 2010/0046749 A1 | 2/2010 | Hatano et al. |
| 2011/0064216 A1* | 3/2011 | Naccache ............ H04L 9/3247 |
| | | 380/28 |
| 2011/0126020 A1 | 5/2011 | Isshiki |
| 2020/0067697 A1* | 2/2020 | Puddu .................. G06Q 20/382 |
| 2020/0265141 A1 | 8/2020 | Díaz Vico et al. |
| 2020/0304290 A1* | 9/2020 | Coulmeau ............ G06F 21/645 |
| 2021/0144006 A1* | 5/2021 | Ma ........................ H04L 9/0643 |

OTHER PUBLICATIONS

Tamiya et al., Multi-Input Functional Encryption Using Intel SGX with Efficient Input Control, Computer Security Symposium 2019, pp. 1180-1187 (Oct. 2019) (Year: 2019).*

International Search Report for PCT Application No. PCT/JP2020/021825, mailed on Sep. 8, 2020.

C. Brzuska, M. Fischlin, A. Lehmann, and D. Schroder, "Santizable signatures: How to partially delegate control for authenticated data", In BIOSIG, pp. 117-128, 2009.

JP Office Communication for JP Application No. 2022-529192, mailed on Nov. 14, 2023 with English Translation.

* cited by examiner

SIGNATURE VERIFICATION SYSTEM, SIGNATURE APPARATUS, SIGNATURE VERIFICATION METHOD, AND PROGRAM

This application is a National Stage Entry of PCT/JP2020/021825 filed on Jun. 2, 2020, the contents of all of which are incorporated herein by reference, in their entirety.

TECHNICAL FIELD

The present invention relates to a signature verification system, a signature apparatus, a signature verification method, and a program.

BACKGROUND ART

Recent improvements in performance of artificial intelligence (AI) analysis have increased the value of data subject to analysis. This has led to a study of a mechanism in which an individual provides his/her own data to a company desiring to have the data and accepts compensation for the data. As such a mechanism, personal data trust banks, which manage and operate data of individuals, have attracted attention.

In the personal data trust bank mechanism, first, a personal data provider creates data related to an individual and signs the data. The signed data is provided to the individual. The individual having received the signed data deposits the signed data in the personal data trust bank. The personal data trust bank provides the signed data thus deposited, to a personal data user.

The signing by the personal data provider is performed to identify the source of the data and maintain reliability of the data. Hence, when the data is changed, verification of the signature fails. However, it is desired in some cases to change part of the data while maintaining the validity of the signature. For example, in a case where the data includes physical examination data of an individual, there may be a case where the individual desires to hide part of the physical examination data. Specifically, there may be, for example, a case of allowing data of weight to be provided while not desiring to provide data of blood type in the physical examination data.

Moreover, there may be a case where the personal data trust bank desires to change data of an individual according to a demand of a personal data user and provide the changed data to the personal data user. If the personal data trust bank is not capable of changing the data in such a case, the personal data trust bank needs to ask, each time, the individual to provide data satisfying the demand of the personal data user, which requires some work. Hence, by an individual designating a personal data trust bank and permitting change of data by the designated personal data trust bank, such work can be eliminated. This is also referred to as delegation of change capability by an individual (i.e., a changer) capable of changing data. The personal data trust bank to which the change capability is delegated is also referred to as a changer of a delegator.

By using a technique described in NPL 1, in order to delegate the capability of changing data to a delegator (personal data trust bank), a changer (individual) newly generates a signature for the delegator and adds the generated signature to a signature from a signer (personal data provider). In this way, the change capability can be delegated.

CITATION LIST

Non Patent Literature

[NPL 1] C. Brzuska, M. Fischlin, A. Lehmann, and D. Schroder, "Santizable signatures: How to partially delegate control for authenticated data", In BIOSIG, pages 117-128, 2009

SUMMARY

Technical Problem

However, the technique described in NPL 1 increases the number of signatures and consequently a signature size, which also increases computation cost for verification.

An example object of the present invention is to provide a signature verification system, a signature apparatus, a signature verification method, and a program that enable delegation of the capability of changing data without increasing a signature size and computation cost for verification.

Solution to Problem

A signature verification system according to an example aspect of the present invention includes: a signature apparatus configured to sign a first chameleon hash value calculated using a public key for changers of data and a public key for the changers of a temporary delegator of the data, an unmodifiable part of the data, and a second chameleon hash value of an entirety of the data calculated using the public key for the changers; a changing apparatus configured to receive the signed data, and to change the public key for the changers of the temporary delegator to a public key for changers of an actual delegator, using a private key for the changers; a delegator changing apparatus configured to receive the signed data designated the changers of the actual delegator, and to change a modifiable part of the data, using a private key for the changers of the actual delegator; and a verifying apparatus configured to receive the signed data with the changed modifiable part of the data, and to verify the signature using the public key for the changers and the public key for the changers of the actual delegator.

A signature apparatus according to an example aspect of the present invention is configured to sign a first chameleon hash value calculated using a public key for changers of data and a public key for changers of a temporary delegator of the data, an unmodifiable part of the data, and a second chameleon hash value for an entirety of the data calculated using the public key for the changers.

A signature verification method according to an example aspect of the present invention includes: a signature step of signing a first chameleon hash value calculated using a public key for changers of data and a public key for the changers of a temporary delegator of the data, an unmodifiable part of the data, and a second chameleon hash value of an entirety of the data calculated using the public key for the changers; a first changing step of receiving the signed data, and changing the public key for the changers of the temporary delegator to a public key for changers of an actual delegator, using a private key for the changers; a second changing step of receiving the signed data designated the changers of the actual delegator, and changing a modifiable part of the data, using a private key for the changers of the actual delegator; and a verifying step of receiving the signed data with the changed modifiable part of the data, and verifying the signature using the public key for the changers and the public key for the changers of the actual delegator.

A program according to an example aspect of the present invention causes a computer to execute the signature verification method.

Advantageous Effects of Invention

According to the present invention, it is possible to delegate the capability of changing data without increasing a signature size and computation cost for verification.

DESCRIPTION OF THE EXAMPLE EMBODIMENTS

Hereinafter, example embodiments of the present invention will be described with reference to the drawings. Note that, in the Specification and drawings, elements to which similar descriptions are applicable are denoted by the same reference signs, and overlapping descriptions may hence be omitted.

Figure 1:
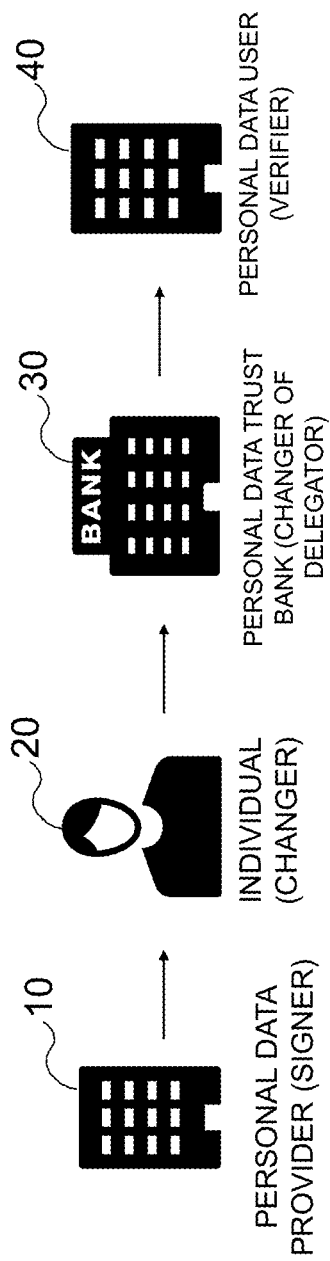
FIG. 1 is a diagram describing an overview of example embodiments of the present invention.

Descriptions will be given in the following order.
1. Overview of Example Embodiments of the Present Invention
2. First Example Embodiment
   2.1. System Configuration
   2.2. Operation Example
   2.3. Concrete Example
   2.4. Hardware Configuration
   2.5. Description of Effects
3. Second Example Embodiment
   3.1. System Configuration
   3.2. Operation Example
   3.3. Description of Effects
4. Other Example Embodiments 1. Overview of Example Embodiments of the Present Invention FIG. 1 is a diagram describing an overview of example embodiments of the present invention. The example embodiments of the present invention will be described based on a system including personal data trust banks that manage and operate data of an individual as described above.

As illustrated in FIG. 1, a system according to one example embodiment of the present invention includes a personal data provider 10, an individual 20, personal data trust banks 30, and personal data users 40.

The personal data provider 10 generates data related to the individual 20, signs the generated data, and provides the signed data to the individual 20. The data includes temporary delegator changer data to designate changers of an actual delegator by the individual 20, as will be described later. The personal data provider 10 may be a signer of data in the example embodiments of the present invention.

The individual 20 changes the temporary delegator changer data included in the received signed data to actual delegator changer data and provides the signed data with the changed delegator changer data to the personal data trust bank 30, while maintaining the validity of the signature by the personal data provider 10. The data includes a modifiable part and an unmodifiable part, and the individual 20 may change the modifiable part of the data. The individual 20 may be a changer of data in the example embodiments of the present invention.

Each personal data trust bank 30 can, when the personal data trust bank 30 itself is designated by the delegator changer data, change the modifiable part of the data and provide the signed data thus changed to the personal data user 40, while maintaining the validity of the signature by the personal data provider 10. The personal data trust bank 30 may be a changer of the delegator to which the capability of changing the data is delegated in the example embodiments of the present invention.

Each of the personal data users 40 verifies the signature of the signed data received from the personal data trust bank 30. When the verification succeeds, the personal data user 40 uses the data. The personal data user 40 may be a verifier of data in the example embodiments of the present invention.

According to the example embodiments of the present invention, it is possible, in such a system, to delegate the capability of changing data without increasing a signature size and computation cost for verification. Note that the number of personal data providers 10, the number of individuals 20, the number of personal data trust banks 30, and the number of personal data users 40 are not limited to the numbers illustrated in FIG. 1.

In the example embodiments of the present invention, as a so-called sanitizable signature, an electronic signature for which changers (individual 20) and changers of a delegator (personal data trust bank 30) can change a predetermined part of a message (data) without communicating with an original signer (personal data provider 10) and generate a valid signature for the changed message.

The sanitizable signature according to the example embodiments of the present invention is provided using a chameleon hash. A standard hash function (a hash function that is not a chameleon hash) has characteristics of compressing an input message to a value (hash value) of a predetermined bit length and not generating the same hash value unless an identical message is input. Specifically, assume that messages are denoted by m and m' and the hash function is denoted by H( ). In a case where m≠m', $H(m) \neq H(m')$. The characteristics are called collision resistance. The standard hash function also has characteristics that it is difficult to find any collision on a (input) hash value. Specifically, it is difficult to obtain m' such that $H(m')=H(m)$ on input m and H(m). Note that m≠m'. The characteristics are called second preimage resistance. In contrast, a chameleon hash is a hash function with which a collision can be found when a certain private key is known.

Figure 2A:
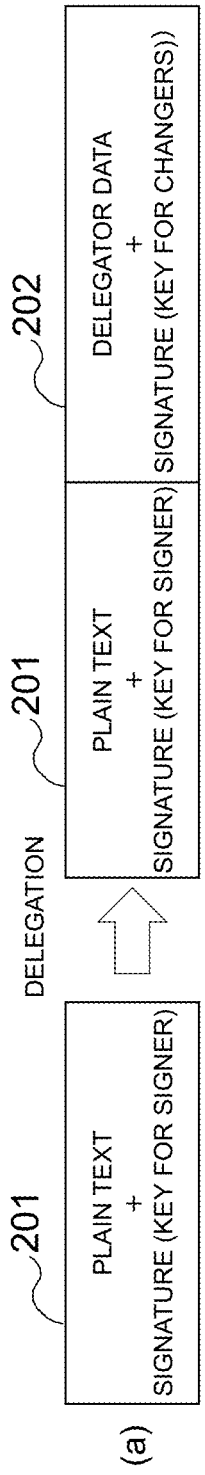
FIGS. 2A and 2B are each a diagram describing a method of delegating a change capability according to the example embodiments of the present invention.
Figure 2B:
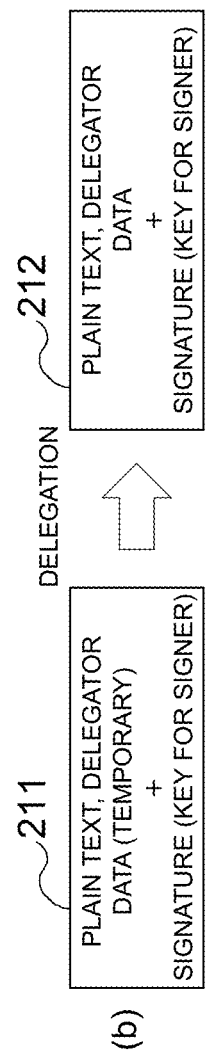

FIGS. 2A and 2B are each a diagram describing a method of delegating change capability according to the example embodiments of the present invention. In the following, a description will be given of a method in which changers having the capability of changing data designates changers of a delegator corresponding a delegator to which a change capability is delegated, while maintaining the validity of a signature by a signer.

First, with reference to FIG. 2A, a method of designating changers of a delegator by using the technique described in NPL 1 described above will be described.

In FIG. 2A, when a changer delegates the change capability for plain text+signature (a key for a signer) 201, delegator data+signature (a key for the changer) 202 is added to the plain text+signature (the key for the signer) 201. In other words, by providing the delegator data+signature (the key for the changer) 202 to the plain text+signature (the key for the signer) 201, changers of the delegator are designated. This method requires a new signature for the delegator data, which consequently increases a signature size and computation cost for verification.

Next, with reference to FIG. 2B, a method of designating changers of a delegator according to the example embodiments of the present invention will be described.

In FIG. 2B, first, signing is performed using a key for a signer in a state where temporary delegator data is added to a plain text (211). A changer changes, in order to designate changers of the delegator, the temporary delegator data to actual delegator data while maintaining the validity of the signature by the signer (212). This method does not require a new signature for the delegator data, which enables the change capability to be delegated without increasing a signature size and computation cost for verification.

2. First Example Embodiment

2.1. System Configuration

Figure 3:
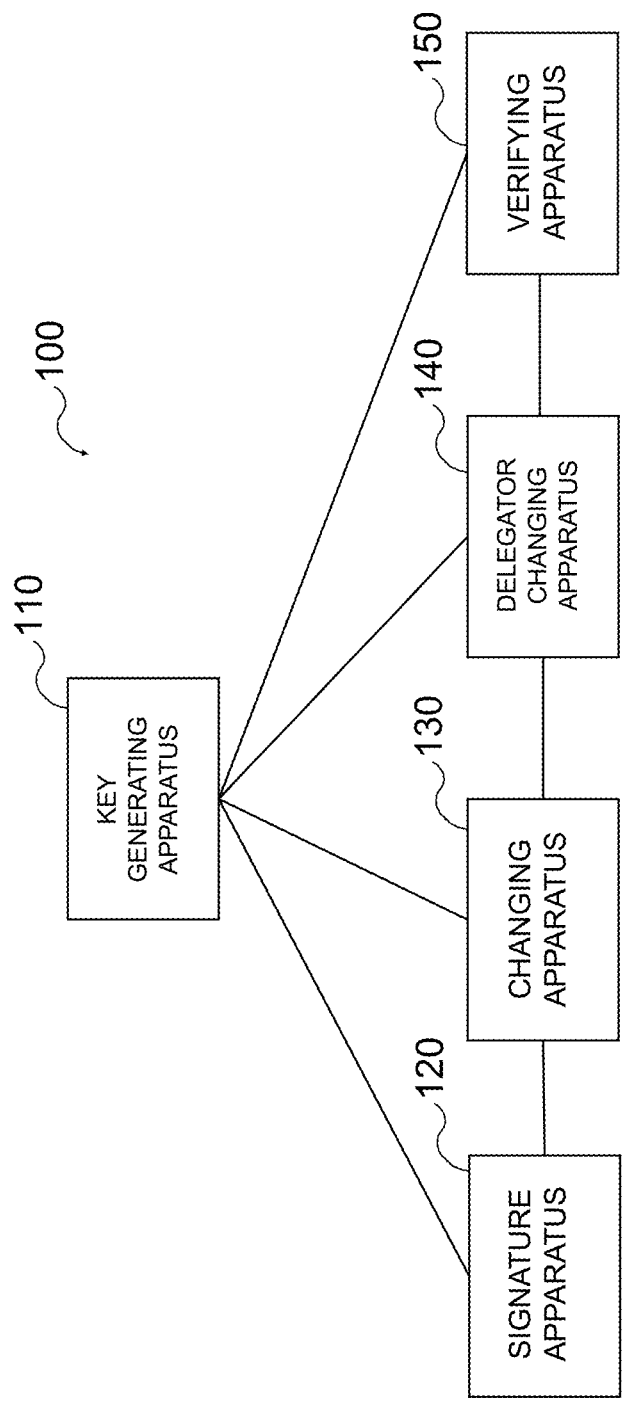
FIG. 3 is a block diagram illustrating an example of a configuration of a signature verification system according to a first example embodiment.

FIG. 3 is a block diagram illustrating an example of a configuration of a signature verification system according to a first example embodiment. A signature verification system 100 includes a key generating apparatus 110, a signature apparatus 120, a changing apparatus 130, a delegator changing apparatus 140, and a verifying apparatus 150. Each of constituent elements of the signature verification system 100 will be described in detail with reference to FIG. 4.

Figure 4:
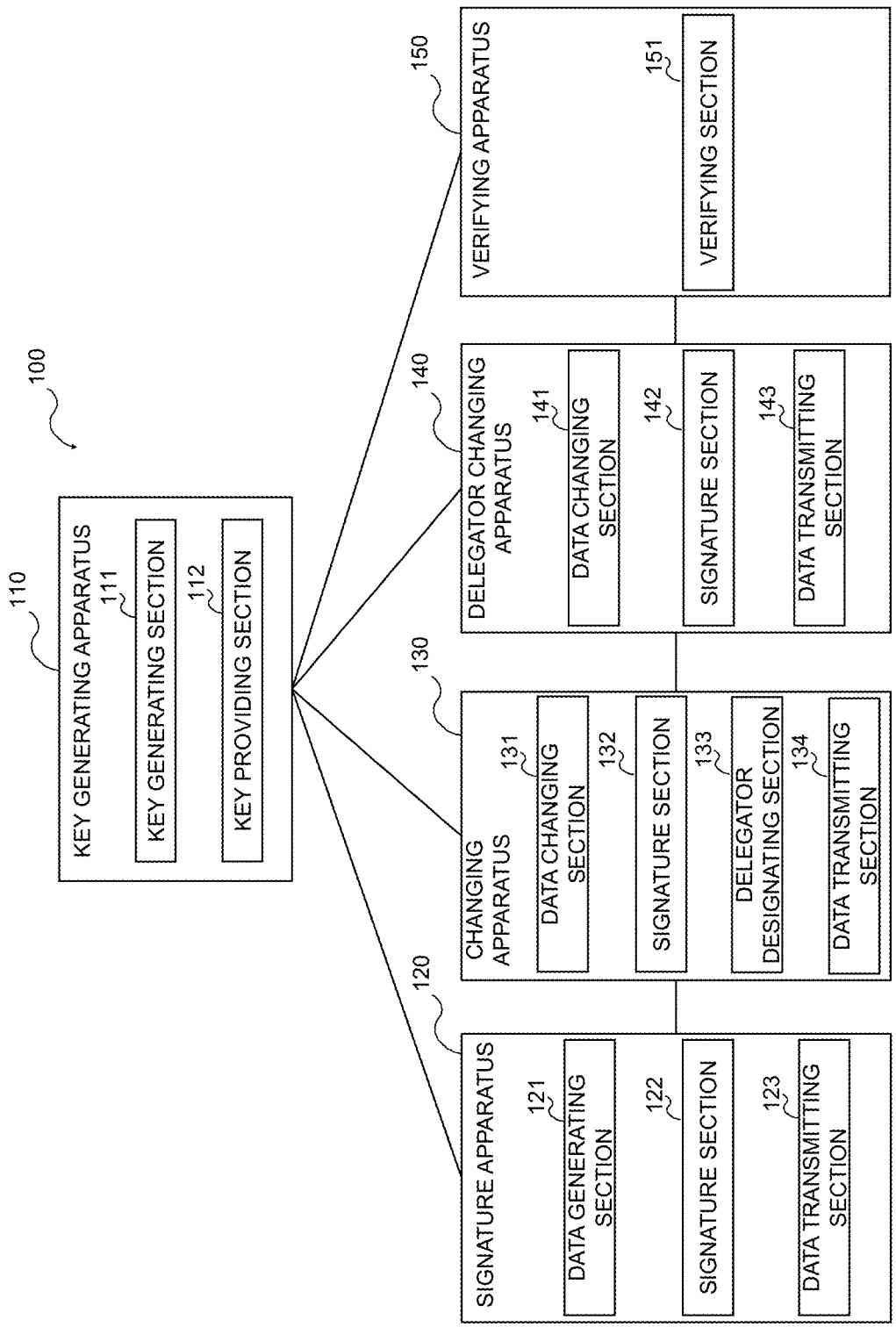
FIG. 4 is a functional block diagram illustrating an example of a concrete configuration of the signature verification system according to the first example embodiment.

FIG. 4 is a functional block diagram illustrating an example of a concrete configuration of the signature verification system according to the first example embodiment.

The key generating apparatus 110 includes a key generating section 111 and a key providing section 112. The key generating section 111 generates pairs of keys to be used for signing data. Specifically, the key generating section 111 generates a pair of a public key $pk_{sign}$ and a private key $sk_{sign}$ for signing and verification, a pair of a public key $pk_{san}$ and a private key $sk_{san}$ to be used for a changer to designate a delegator of a change capability, and a pair of a public key $pk_{dsan}$ and a private key $sk_{dsan}$ for data change to be used by changers of the delegator to change data. The key providing section 112 provides the generated keys to the signature apparatus 120, the changing apparatus 130, the delegator changing apparatus 140, and the verifying apparatus 150. Note that the keys can be provided in any method, and may be transmitted via a network or may be stored and transported in a removable storage apparatus. Key generation in the key generating apparatus 110 may be performed by the signature apparatus 120 or the changing apparatus 130.

The signature apparatus 120 includes a data generating section 121, a signature section 122, and a data transmitting section 123. The signature apparatus 120 corresponds to an apparatus used by the personal data provider 10 described above. The data generating section 121 generates target data. The data includes a modifiable part, which can be changed, and an unmodifiable part, which is prohibited from changing. The data is also referred to as a plain text. The signature section 122 signs a chameleon hash value using a public key for changers and a temporary public key for changers of a delegator, a fixed part (unmodifiable part) of the plain text, and a chameleon hash value for the entire plain text. The data transmitting section 123 transmits the signed data to the changing apparatus 130.

The changing apparatus 130 includes a data changing section 131, a signature section 132, a delegator designating section 133, and a data transmitting section 134. The changing apparatus 130 corresponds to an apparatus used by the individual 20 described above. The data changing section 131 changes the modifiable part of the plain text in the signed data. The signature section 132 signs the changed plain text with a sanitizable signature. The delegator designating section 133 changes the temporary public key for the changers of the delegator to the public key for the changers of the actual delegator, to thereby designate the changers of the actual delegator. The data transmitting section 134 transmits the signed data after the change, to the delegator changing apparatus 140.

The delegator changing apparatus 140 includes a data changing section 141, a signature section 142, and a data transmitting section 143. The delegator changing apparatus 140 corresponds to an apparatus used by the personal data trust bank 30 described above. The data changing section 141 changes the modifiable part of the plain text in the signed data. The signature section 142 signs the changed plain text with a sanitizable signature. The data transmitting section 143 transmits the signed data after the change, to the verifying apparatus 150.

The verifying apparatus 150 includes a verifying section 151. The verifying apparatus 150 corresponds to an apparatus used by the personal data user 40 described above. The verifying section 151 verifies the signature of the signed data after the change, using the public key associated with the private key for the signature, the public key for the changers, and the public key for the changers of the delegator. When the verification succeeds, the personal data user 40 can use the data for which the verification succeeds, for a desired purpose.

Each of the processing sections of the apparatuses described above is implemented with a central processing unit (CPU) of a computer configured to operate according to a program and a communication interface of the computer, for example. For example, the CPU reads the program from a program recording medium, such as a program storage apparatus of the computer, and uses, as necessary, the communication interface to operate as each of the processing sections of the apparatuses described above according to the program.

2.2. Operation Example

Next, an operation example according to the first example embodiment will be described.

Figure 5:
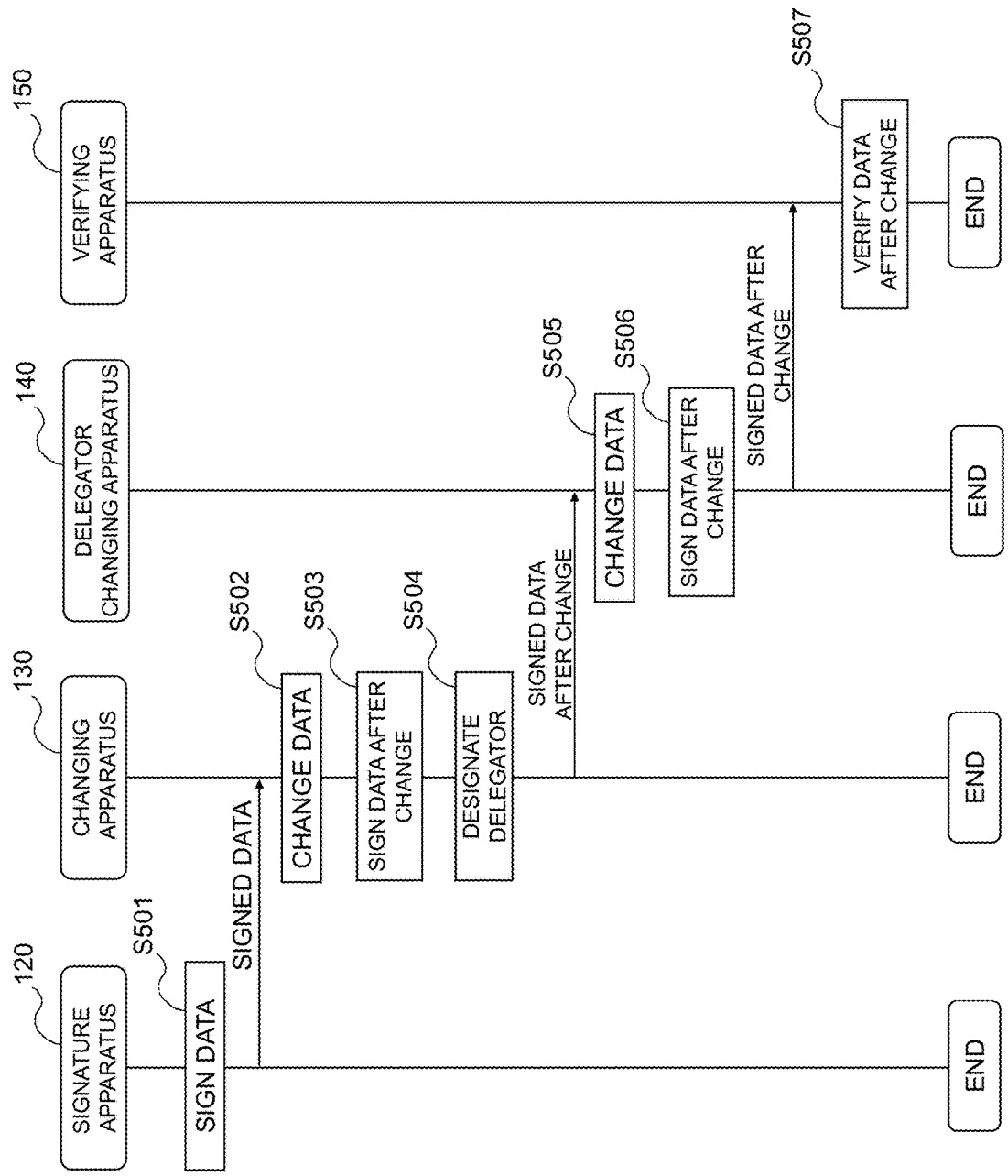
FIG. 5 is a sequence diagram of signature verification processing according to the first example embodiment.

FIG. 5 is a sequence diagram of signature verification processing according to the first example embodiment. Note that detailed descriptions of what have already been described are omitted.

First, in step S501, the signature apparatus 120 signs the chameleon hash value using the public key for the changers and the temporary public key for the changers of the delegator, the fixed part (unmodifiable part) of the plain text, and the chameleon hash value for the entire plain text. The signing itself is performed in a general scheme using a private key for a signature. The signed data after the signing is provided to the changing apparatus 130.

Next, in step S502, the changing apparatus 130 changes a modifiable part of the signed data. The data can be changed when the changing apparatus 130 has the private key associated with the public key for the changers. Thereafter, in step S503, the changing apparatus 130 signs the data after the change in a sanitizable manner. Further, in step S504, the changing apparatus 130 changes the public key for the changers of the temporary delegator to the public key for the changers of the actual delegator, to thereby designate the changers of the delegator. The signed data after the change is provided to the delegator changing apparatus 140.

Next, in step S505, the delegator changing apparatus 140 changes the modifiable part of the signed data. The data can be changed when the delegator changing apparatus 140 has the private key associated with the public key for the changers of the delegator. Thereafter, in step S506, the delegator changing apparatus 140 signs the data after the change in a sanitizable manner. The signed data after the change is provided to the verifying apparatus 150.

Then, in step S507, the verifying apparatus 150 verifies the signed data after the change, using the public key associated with the private key for the signature, the public key for the changers, and the public key for the changers of the delegator.

The signature verification processing according to the present example embodiment is performed as described above.

2.3. Concrete Example

Next, a concrete example of signature verification processing according to the present example embodiment will be described.

First, extension of a chameleon hash based sanitizable signature according to the present example embodiment will be described.

In the present example embodiment, two kinds of chameleon hash are used. The two kinds of chameleon hash are a plain text change chameleon hash (also referred to as an MCH) as well as a key and plain text change chameleon hash (also referred to as KMCH).

With the plain text change chameleon hash (MCH), for a public key pk, a message m before change, a random number r, and a message m' after change, a random number r' satisfying Expression (1) below can be calculated by using a private key sk for the public key pk.

[Math. 1]

$$MC(pk,m,r)=MCH(pk,m',r') \quad (1)$$

With the key and plain text change chameleon hash (KMCH), for the public key pk, the message m before change, the random number r, and the message m' after change, the random number r' satisfying Expression (2) below can be calculated by using a private key sk' for the public key pk'.

[Math. 2]

$$KMCH(pk,m,r)=KMCH(pk',m',r') \quad (2)$$

Next, a procedure from signing to verification will be described by using the above-described two kinds of chameleon hash.

First, a signer (signature apparatus 120) signs an MCH hash value of temporary delegator data, a plain text $m_{FIX}$ corresponding to a fixed part, and a KMCH hash value of an entire plain text $m_{FULL}$ by employing a general signature method as presented in Expression (3) below. Examples of the general signature method include a signature method of a digital signature algorithm (DSA) scheme, for example.

[Math. 3]

$$\text{Sign}(sk_{sig}, MCH(pk_{san}, pk_{san}, r_{mch}) \| m_{FIX} \| KMCH(pk_{san}, m_{FULL}, r_{kmch})) \quad (3)$$

Here, the second $pk_{san}$ (i.e., a public key for changers) of the MCH is used as a public key for changers of the temporary delegator.

Subsequently, a changer (changing apparatus 130) changes the public key $pk_{san}$ for the changers of the temporary delegator to a public key $pk_{dsan}$ for changers of an actual delegator by using the characteristics of the MCH as presented in Expression (4) below.

[Math. 4]

$$\text{Sign}(sk_{sig}, MCH(pk_{san}, pk_{dsan}, r_{mch}') \| m_{FIX} \| KMCH(pk_{san}, m_{FULL}, r_{kmch})) \quad (4)$$

Here, a random number $r_{mch}$ is changed to a random number $r_{mch}'$ in actual.

Subsequently, a changer of the delegator (delegator changing apparatus 140) changes the plain text excluding the fixed part (i.e., the modifiable part), using the secret key for the changers of the delegator by using the characteristics of the KMCH as presented in Expression (5) below.

[Math. 5]

$$\text{Sign}(sk_{sig}, MCH(pk_{san}, pk_{dsan}, r_{mch}') \| m_{FIX} \| KMCH(pk_{dsan}, m_{FULL}', r_{kmch}')) \quad (5)$$

Here, a random number $r_{kmch}$ is changed to a random number $r'_{kmch}$ in actual. $m_{FULL}$ denoting the entire plain text is changed to $m'_{FULL}$.

Subsequently, a verifier (verifying apparatus 150) regenerates the hash value and verifies a signature by using the random numbers, plain texts, and public keys for the verifier, changers, and changers of the delegator.

Next, the chameleon hash based sanitizable signature will be described in more detail.

The signer (signature apparatus 120) signs the fixed part $m_{FIX}$ of the plain text and the MCH hash value of the entire plain text $m_{FULL}$ using the public key $pk_{san}$ for the changers, by using a private key $sk_{sig}$ of the signer in a general signature scheme as presented in Expression (6) below. The random number r used for the signing and hash computation is passed to the changer (changing apparatus 130).

[Math. 6]

$$\text{Sign}(sk_{sig}, m_{FIX} \| MCH(pk_{san}, m_{FULL}, r)) \qquad (6)$$

The changer (changing apparatus 130) creates the random number r' for an MCH corresponding to the new plain text m' by using the plain text m, the random number r, and the private key $sk_{san}$ for the changers, replace the random number r used for the hash computation with the random number r', and passes the resultant to the verifier (verifying apparatus 150) as presented in Expression (7) below.

[Math. 7]

$$\text{Sign}(sk_{sig}, m_{FIX} \| MCH(pk_{san}, m_{FULL}', r')) \qquad (7)$$

The verifier (verifying apparatus 150) recalculates an MCH hash value and verifies a signature σ by using the plain text m, the random number r, and the public key $pk_{sig}$ for the signer and the public key $pk_{san}$ for the changers.

As described above, in the present example embodiment, with the characteristics of the MCH, the changer can calculate the random number r' for the plain text $m'_{FULL}$ having the same MCH hash value by using the private key $sk_{san}$.

Next, general key generation, signature, and verification algorithms will be described.

A key generation algorithm outputs, with an input of a security parameter λ, the public key pk and the private key sk as presented in Expression (8) below.

[Math. 8]

$$(pk, sk) \leftarrow S.\text{KeyG}(1^\lambda) \qquad (8)$$

The signature algorithm outputs, with inputs of the private key sk and the plain text m, the signature cr for the plain text m as presented in Expression (9) below.

[Math. 9]

$$\sigma \leftarrow S.\text{Sign}(sk, m) \qquad (9)$$

With inputs of the public key pk, the plain text m, and the signature σ, the verification algorithm returns True when the signature is valid while returning False when the signature is invalid as presented in Expression (10) below.

[Math. 10]

$$\{true, false\} \leftarrow S.\text{Verify}(pk, m, \sigma) \qquad (10)$$

Next, each algorithm in the plain text change chameleon hash (MCH) will be described.

A key generation algorithm outputs, with an input of a security parameter λ, the public key pk and the private key sk as presented in Expression (11) below.

[Math. 11]

$$(pk, sk) \leftarrow MCH.\text{KeyGen}(1^\lambda) \qquad (11)$$

A hash algorithm outputs, with inputs of the public key pk and the plain text m, a hash value h and the random number r as presented in Expression (12) below.

[Math. 12]

$$(h, r) \leftarrow MCH.\text{Hash}(pk, m) \qquad (12)$$

A rehash algorithm outputs the hash value h, with inputs of the public key pk, the plain text m, and the random number r, as presented in Expression (13) below.

[Math. 13]

$$h \leftarrow MCH.\text{ReHash}(pk, m, r) \qquad (13)$$

An adaptive algorithm outputs, with inputs of the private key sk, the plain text m, the plain text m' after change, and the random number r, a new random number r' satisfying Expression (15) below, as presented in Expression (14) below.

[Math. 14]

$$r' \leftarrow MCH.\text{Adapt}(sk, m, m', r) \qquad (14)$$

[Math. 15]

$$MCH.\text{ReHash}(pk, m, r) = MCH.\text{ReHash}(pk, m', r') \qquad (15)$$

Next, each algorithm in the key and plain text change chameleon hash (KMCH) will be described.

A key generation algorithm outputs, with an input of a security parameter λ, the public key pk and the private key sk as presented in Expression (16) below.

[Math. 16]

$$(pk, sk) \leftarrow KMCH.\text{KeyGen}(1^\lambda) \qquad (16)$$

A hash algorithm outputs, with inputs of the public key pk and the plain text m, a hash value h and the random number r as presented in Expression (17) below.

[Math. 17]

$$(h, r) \leftarrow KMCH.\text{Hash}(pk, m) \qquad (17)$$

A rehash algorithm outputs the hash value h, with inputs of the public key pk, the plain text m, and the random number r, as presented in Expression (18) below.

[Math. 18]

$$h \leftarrow KMCH.\text{ReHash}(pk, m, r) \qquad (18)$$

An adaptive algorithm outputs, with inputs of the private key sk', the plain text m, the plain text m' after change, and the random number r, a new random number r' satisfying Expression (20) below as presented in Expression (19) below.

[Math. 19]

$$r' \leftarrow KMCH.\text{Adapt}(sk', m, m', r) \qquad (19)$$

[Math. 20]

$$KMCH.\text{ReHash}(pk, m, r) = KMCH.\text{ReHash}(pk', m', r') \qquad (20)$$

In the following, algorithms in the kinds of processing according to the present example embodiment will be described concretely.

The following table presents key generation algorithms for the signer, changers, and changers of the delegator.

TABLE 1

(Signer) Signer key generation algorithm $(pk_{sig}, sk_{sig}) \leftarrow$ DSS.SigKeyGen($1^\lambda$)
   1. $(pk_{sig}, sk_{sig}) \leftarrow$ S.KeyGen($1^\lambda$)
(Changer) Changer key generation algorithm $(pk_{san}, sk_{san}) \leftarrow$ DSS.SanKeyGen($1^\lambda$)
   1. $(pk_{san,mch}, sk_{san,mch}) \leftarrow$ MCH.KeyGen($1^\lambda$),
      $(pk_{san,kmch}, sk_{san,kmch}) \leftarrow$ KMCH.KeyGen($1^\lambda$)
   2. $(pk_{san}, sk_{san}) = ((pk_{san,mch}, pk_{san,kmch}), (sk_{san,mch}, sk_{san,kmch}))$
(Changer of delegator) Delegator changer key generation algorithm
$(pk_{del}, sk_{del}) \leftarrow$ DSS.DelKeyGen($1^\lambda$)
   1. $(pk_{del,kmch}, sk_{del,kmch}) \leftarrow$ KMCH.KeyGen($1^\lambda$)
   2. $(pk_{del}, sk_{del}) = (pk_{del,kmch}, sk_{del,kmch})$ Here, for a key pair for the signer, with an input of the security parameter $\lambda$, the public key $pk_{sig}$ and the private key $sk_{sig}$ are output. For a key pair for the changers, with an input of the security parameter $\lambda$, the public key $pk_{san}$ and the private key $sk_{san}$ are output. For a key pair for the changers of the delegator, with an input of the security parameter $\lambda$, the public key $pk_{del}$ and the private key $sk_{del}$ are output.

The following table presents a signature algorithm for the signer.

TABLE 2

(Signer) Signature algorithm $\sigma \leftarrow$ DSS.Sign($sk_{sig}, pk_{san}, m$)
   1. $(h_{mch}, r_{mch}) \leftarrow$ MCH.Hash($pk_{san,mch}, pk_{san,kmch}$),
      $(h_{kmch}, r_{kmch}) \leftarrow$ KMCH.Hash($pk_{san,kmch}, m$)
   2. $s \leftarrow$ S.Sign($sk_{sig}, h_{mch} \| m_{FIX} \| h_{kmch}$)
   3. Output $\sigma = (s, r_{mch}, r_{kmch}, FIX)$. Here, $mix \leftarrow FIX(m)$.

Here, with inputs of the private key $sk_{sig}$ for the signer, the public key $pk_{san}$ for the changers, and the plain text m, the signature $\sigma$ for the plain text m is output.

The following table presents a sanitizable signature algorithm for the changers.

TABLE 3

(Changer) Sanitizable algorithm $\sigma' \leftarrow$ DSS.Sanit($sk_{san}, m, m', \sigma$)
   1. $r_{kmch}' \leftarrow$ KMCH.Adapt($sk_{san,kmch}, m, m', r_{kmch}$)
   2. $\sigma' = (s, r_{mch}, r_{kmch}')$ Here, with inputs of the private key $sk_{san}$ for the changers, the plain text m, the plain text m' after change, and the signature $\sigma$ for the plain text m, a signature $\sigma'$ for the plain text m' after change is output.

The following table presents a verification algorithm for the verifier.

TABLE 4

(Verifier) Verification algorithm $d \in \{True, False\} \leftarrow$ DSS.Verify($pk_{sig}, pk_{san}, m, \sigma$)
   1. $h_{mch} \leftarrow$ MCH.ReHash($pk_{san,mch}, pk_{san,kmch}, r_{mch}$)
   2. $h_{kmch} \leftarrow$ KMCH.ReHash($pk_{san,kmch}, m, r_{kmch}$)
   3. $m_{FIX} \leftarrow FIX(m_{FULL})$
   4. $d \leftarrow$ S.Verify($pk_{sig}, h_{mch} \| m_{FIX} \| h_{kmch}$)
   5. If $d = True$, return True. If $d = False$, return False.

Here, with inputs of the public key $pk_{sig}$ for the signer, the public key $pk_{san}$ for the changers, the plain text m, and the signature $\sigma$, True is returned when the signature is valid while False is returned when the signature is invalid.

The following table presents a delegation algorithm for the changers.

TABLE 5

(Changer) Delegation algorithm $\sigma' \leftarrow$ DSS.Delegate($pk_{san}, sk_{san}, pk_{del}, \sigma$)
   1. $r_{mch}' \leftarrow$ KMCH.Adapt ($sk_{san,kmch}, pk_{san,kmch}, pk_{del,kmch}, r_{mch}$)
   2. $\sigma' = (s, r_{mch}', r_{kmch})$ Here, with inputs of the public key $pk_{san}$ for the changers, the private key $sk_{san}$ for the changers, the public key $pk_{san}$ for the changers of the delegator, and the signature $\sigma$ before delegation, the signature $\sigma'$ after delegation is output.

The following table presents a sanitizable signature algorithm for the changers of the delegator.

TABLE 6

(Changer of delegator) Delegator santizable algorithm $\sigma' \leftarrow$ DSS.DelSanit($sk_{del}, m, m', \sigma$)
   1. $r_{kmch}' \leftarrow$ KMCH.Adapt ($sk_{del,kmch}, m, m', k_{mch}$)
   2. $\sigma' = (S, r_{mch}, r_{kmch}')$ Here, with inputs of the private key skdel for the changers of the delegator the plain text m, the plain text m' after change, and the signature σ for the plain text m, the signature σ' for the plain text m' after change is output.

The following table presents a delegator verification algorithm for the verifier.

TABLE 7

(Verifier) Delegator verification algorithm
$d \in \{True, False\} \leftarrow DSS.DelVerify (pk_{sig}, pk_{san}, pk_{del}, m, \sigma)$
1. $h_{mch} \leftarrow MCH.ReHash(pk_{san,mch}, pk_{del,kmch}, r_{mch})$
2. $h_{kmch} \leftarrow KMCH.ReHash(pk_{del,kmch}, m, r_{kmch})$
3. $m_{FIX} \leftarrow FIX(m_{FULL})$
4. $d \leftarrow S.Verify(pk_{sig}, h_{mch} \| m_{FIX} \| h_{kmch})$
5. If d = True, return True . If d = False, return False .

Here, with inputs of the public key $pk_{sig}$ for the signer, the public key $pk_{san}$ for the changers, the public key $pk_{del}$ for the changers of the delegator, the plain text m, and the signature σ, True is returned when the signature is valid while False is returned when the signature is invalid.

Note that since the KMCH includes the MCH, the MCH may be replaced with the KMCH.

2.4. Hardware Configuration

Figure 6:
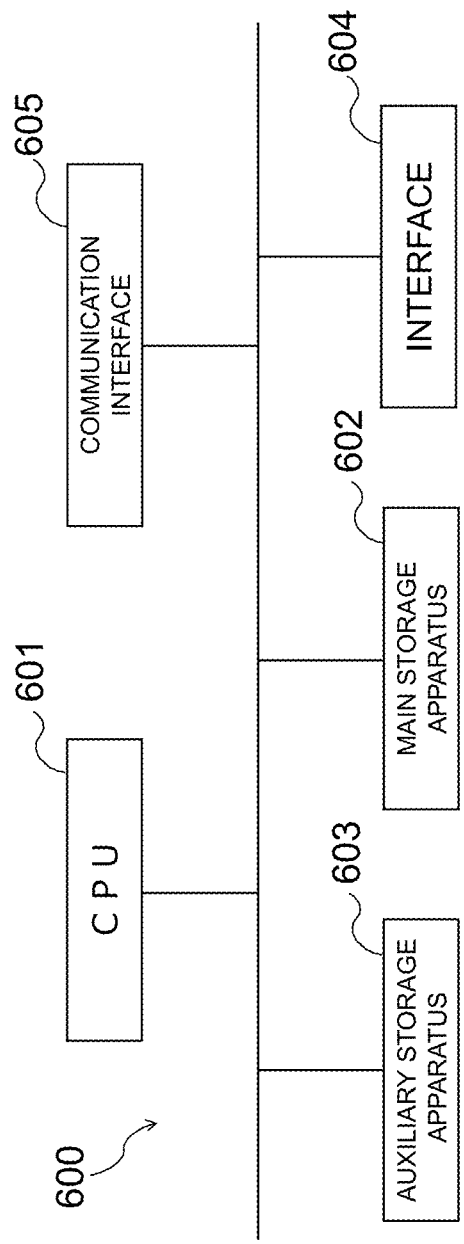
FIG. 6 is a schematic block diagram illustrating an example of a hardware configuration of a computer according to the first example embodiment.

FIG. 6 is a schematic block diagram illustrating an example of a hardware configuration of a computer according to the present example embodiment. The computer illustrated in FIG. 6 may operate as each of the apparatuses configuring the signature verification system according to the present example embodiment.

A computer 600 includes a CPU 601, a main storage apparatus 602, an auxiliary storage apparatus 603, an interface 604, and a communication interface 605.

Operations of the computer 600 are stored in the auxiliary storage apparatus 603 in a form of program. The CPU 601 reads the program from the auxiliary storage apparatus 603 and develops the program to the main storage apparatus 602, and performs, according to the program, operations of each of the apparatuses described in the present example embodiment.

The auxiliary storage apparatus 603 is an example of a non-transitory tangible medium. Other examples of the non-transitory tangible medium include a magnetic disk, a magneto-optical disk, a compact disk read only memory (CD-ROM), a digital versatile disk read only memory (DVD-ROM), and a semiconductor memory connected via the interface 604. When the program is distributed to the computer 600 through a communication line, the computer 600 that has received the distribution may develop the program to the main storage apparatus 602 and operate according to the program.

Part or all of the constituent elements of each of the apparatuses may be implemented with general-purpose or dedicated circuitry, processor, or the like, or a combination of these. These may be configured of a single chip or may be configured of a plurality of chips connected via a bus. Part or all of the constituent elements may be implemented with a combination of the circuitry or the like and the program described above.

2.5. Description of Effects

According to the present example embodiment, it is possible to delegate the capability of changing data without increasing a signature size and computation cost for verification.

3. Second Example Embodiment

Next, a description will be given of a second example embodiment of the present invention with reference to FIG. 7. The above-described first example embodiment is a concrete example embodiment, whereas the second example embodiment is a more generalized example embodiment.

3.1. System Configuration

Figure 7:
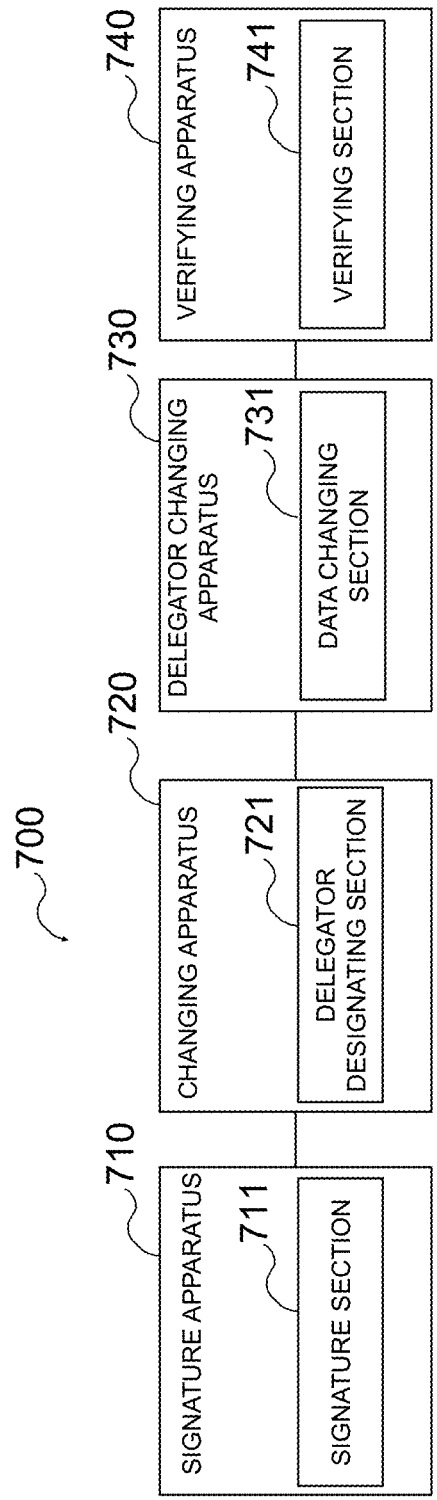
FIG. 7 is a functional block diagram illustrating an example of a concrete configuration of a signature verification system according to a second example embodiment.

FIG. 7 is a functional block diagram illustrating an example of a concrete configuration of a signature verification system according to the second example embodiment. A signature verification system 700 according to the present example embodiment includes a signature apparatus 710, a changing apparatus 720, a delegator changing apparatus 730, and a verifying apparatus 740. Note that the number of signature apparatuses 710, the number of changing apparatuses 720, the number of delegator changing apparatuses 730, and the number of verifying apparatuses 740 are not limited to the numbers illustrated in FIG. 7. The signature apparatus 710, the changing apparatus 720, the delegator changing apparatus 730, and the verifying apparatus 740 may be connected to each other via a communication network.

The signature apparatus 710 includes a signature section 711. The signature section 711 signs a first chameleon hash value calculated using a public key for changers of data and a temporary public key for changers of a delegator, to which change of the data is delegated, an unmodifiable part of the data, and a second chameleon hash value for an entirety of the data calculated using the public key for the changers.

The changing apparatus 720 includes a delegator designating section 721. The delegator designating section 721 receives the signed data after signing and changes a temporary public key for the changers of the delegator to a public key for changers of an actual delegator, using a private key for the changers.

The delegator changing apparatus 730 includes a data changing section 731. The data changing section 731 receives the signed data designated the changers of the actual delegator and changes a modifiable part of the data, using a private key for the changers of the actual delegator.

The verifying apparatus 740 includes a verifying section 741. The verifying section 741 receives the signed data with the changed modifiable part of the data and verifies the signature, using the public key for the changers and the public key for the changers of the actual delegator.

Each of the processing sections of the apparatuses described above is implemented with a central processing unit (CPU) of a computer configured to operate according to a program and a communication interface of the computer, for example. For example, the CPU reads the program from a program recording medium, such as a program storage apparatus of the computer, and uses, as necessary, the communication interface to operate as each of the processing sections of the apparatuses described above according to the program.

3.2. Operation Example

Next, an operation example according to the second example embodiment will be described.

According to the second example embodiment, the signature apparatus 710 (signature section 711) signs a first chameleon hash value calculated using a public key for changers of data and a temporary public key for changers of a delegator, to which change of the data is delegated, an unmodifiable part of the data, and a second chameleon hash value for an entirety of the data calculated using the public key for the changers. The changing apparatus 720 (delegator designating section 721) receives the signed data after signing and changes a temporary public key for the changers of the delegator to a public key for changers of an actual delegator, using a private key for the changers. The delegator changing apparatus 730 (data changing section 731) receives the signed data designated the changers of the actual delegator and changes a modifiable part of the data, using a private key for the changers of the actual delegator. The verifying apparatus 740 (verifying section 741) receives the signed data with the changed modifiable part of the data and verifies the signature, using the public key for the changers and the public key for the changers of the actual delegator.

Relationship with First Example Embodiment

As an example, the signature apparatus 710, the changing apparatus 720, the delegator changing apparatus 730, and the verifying apparatus 740 according to the second example embodiment are the signature apparatus 120, the changing apparatus 130, the delegator changing apparatus 140, and the verifying apparatus 150 according to the first example embodiment, respectively. In this case, the descriptions of the first example embodiment may also be applicable to the second example embodiment.

Note that the second example embodiment is not limited to this example.

3.3. Description of Effects

According to the second example embodiment, it is possible to delegate the capability of changing data without increasing a signature size and computation cost for verification.

4. Other Example Embodiments

Note that the present invention is not limited to the example embodiments described above. It should be understood by those of ordinary skill in the art that the example embodiments described above are merely examples and that various alterations are possible without departing from the scope and the spirit of the present invention.

For example, the kinds of processing described in the Specification may not necessarily be executed in time series in the order described above. For example, the kinds of processing may be executed in an order different from that described above or may be executed in parallel. Some of the kinds of processing may not necessarily be performed, or more kinds of processing may be added.

An apparatus including constituent elements of the signature verification system described in the Specification (e.g., one or more apparatuses (or units) among a plurality of apparatuses (or units) constituting the signature verification system or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The example embodiments of the present invention can be described as, but not limited to, the following supplementary notes.

(Supplementary Note 1)

A signature verification system including:
  a signature apparatus configured to sign a first chameleon hash value calculated using a public key for changers of data and a public key for the changers of a temporary delegator of the data, an unmodifiable part of the data, and a second chameleon hash value of an entirety of the data calculated using the public key for the changers;
  a changing apparatus configured to receive the signed data, and to change the public key for the changers of the temporary delegator to a public key for changers of an actual delegator, using a private key for the changers;
  a delegator changing apparatus configured to receive the signed data designated the changers of the actual delegator, and to change a modifiable part of the data, using a private key for the changers of the actual delegator; and
  a verifying apparatus configured to receive the signed data with the changed modifiable part of the data, and to verify the signature using the public key for the changers and the public key for the changers of the actual delegator.

(Supplementary Note 2)

The signature verification system according to supplementary note 1, wherein the changing apparatus is configured to replace a random number used for calculation of the first chameleon hash value, with a random number corresponding to the public key for the changers of the actual delegator.

(Supplementary Note 3)

The signature verification system according to supplementary note 1 or 2, wherein the delegator changing apparatus is configured to replace a random number used for calculation of the second chameleon hash value, with a random number calculated using the private key for the changers of the actual delegator and corresponding to the changed data.

(Supplementary Note 4)

The signature verification system according to any one of supplementary notes 1 to 3, wherein the verifying apparatus is configured to regenerate the first chameleon hash value, using the public key for the changers, the public key for the changers of the actual delegator, and the random number corresponding to the public key for the changers of the actual delegator, to regenerate the second chameleon hash value, using the changed data, the public key for the changers of the actual delegator, and the random number for the changed data, and to verify the signature, using the regenerated first chameleon hash value, the unmodifiable part of the data, the second chameleon hash value, and a public key for a signer.

(Supplementary Note 5)

The signature verification system according to any one of supplementary notes 1 to 4, wherein the changing apparatus is configured to change the modifiable part of the data, using the private key for the changers.

(Supplementary Note 6)

The signature verification system according to any one of supplementary notes 1 to 5, wherein the signature apparatus is configured to calculate the first chameleon hash value, using the public key for the changers, as the public key for the changers of the temporary delegator.

(Supplementary Note 7)

A signature apparatus configured to sign a first chameleon hash value calculated using a public key for changers of data and a public key for changers of a temporary delegator of the data, an unmodifiable part of the data, and a second chameleon hash value for an entirety of the data calculated using the public key for the changers.

(Supplementary Note 8)

A signature verification method including:

a signature step of signing a first chameleon hash value calculated using a public key for changers of data and a public key for the changers of a temporary delegator of the data, an unmodifiable part of the data, and a second chameleon hash value of an entirety of the data calculated using the public key for the changers;

a first changing step of receiving the signed data, and changing the public key for the changers of the temporary delegator to a public key for changers of an actual delegator, using a private key for the changers;

a second changing step of receiving the signed data designated the changers of the actual delegator, and changing a modifiable part of the data, using a private key for the changers of the actual delegator; and a verifying step of receiving the signed data with the changed modifiable part of the data, and verifying the signature using the public key for the changers and the public key for the changers of the actual delegator.

(Supplementary Note 9)

A program for causing a computer to execute the signature verification method according to supplementary note 8.

INDUSTRIAL APPLICABILITY

The present invention can be preferably applied to a signature verification system using a sanitizable signature possible to designate changers of a delegator of data.

REFERENCE SIGNS LIST

100 Signature Verification System
110 Key Generating Apparatus
111 Key Generating Section
112 Key Providing Section
120 Signature Apparatus
121 Data Generating Section
122 Signature Section
123 Data Transmitting Section
130 Changing Apparatus
131 Data Changing Section
132 Signature Section
133 Delegator Designating Section
134 Data Transmitting Section
150 Verifying Apparatus
151 Verifying Section

What is claimed is:

1. A signature verification system comprising:
a signature apparatus comprising a first memory storing first instructions and first one or more processors configured to execute the instructions to sign a first chameleon hash value calculated using a first public key for changers of data and a second public key for changers of a temporary delegator of data, an unmodifiable part of the data, and a second chameleon hash value of an entirety of data calculated using the first public key for the changers;

a changing apparatus comprising a second memory storing second instructions and second one or more processors configured to execute the instructions to receive first signed data, and to change the second public key for the changers of the temporary delegator to a third public key for changers of an actual delegator, using a private key for the changers;

a delegator changing apparatus comprising a third memory storing third instructions and third one or more processors configured to execute the instructions to receive second signed data designating the changers of the actual delegator, and to change a modifiable part of the data, using a private key for the changers of the actual delegator; and a verifying apparatus comprising a fourth memory storing fourth instructions and fourth one or more processors configured to execute the instructions to receive third signed data with the changed modifiable part of the data, and to verify the signature using the first public key for the changers and the third public key for the changers of the actual delegator.

2. The signature verification system according to claim 1, wherein the changing apparatus is configured to replace a random number used for calculation of the first chameleon hash value, with a random number corresponding to the third public key for the changers of the actual delegator.

3. The signature verification system according to claim 1, wherein the delegator changing apparatus is configured to replace a random number used for calculation of the second chameleon hash value, with a random number calculated using the private key for the changers of the actual delegator and corresponding to the changed data.

4. The signature verification system according to claim 1, wherein the verifying apparatus is configured to regenerate the first chameleon hash value, using the first public key for the changers, the third public key for the changers of the actual delegator, and a random number corresponding to the third public key for the changers of the actual delegator, to regenerate the second chameleon hash value, using the changed data, the third public key for the changers of the actual delegator, and the random number for the changed data, and to verify the signature, using the regenerated first chameleon hash value, the unmodifiable part of the data, the second chameleon hash value, and a fourth public key for a signer.

5. The signature verification system according to claim 1, wherein the changing apparatus is configured to change the modifiable part of the data, using the private key for the changers.

6. The signature verification system according to claim 1, wherein the signature apparatus is configured to calculate the first chameleon hash value, using the first public key for the changers, as the second public key for the changers of the temporary delegator.

7. A signature verification method performed by one or more computers and comprising:
signing a first chameleon hash value calculated using a first public key for changers of data and a second public key for changers of a temporary delegator of data, an unmodifiable part of the data, and a second chameleon hash value of an entirety of data calculated using the first public key for the changers;

receiving first signed data, and changing the second public key for the changers of the temporary delegator to a third public key for changers of an actual delegator, using a private key for the changers;

receiving second signed data designating the changers of the actual delegator, and changing a modifiable part of the data, using a private key for the changers of the actual delegator; and receiving third signed data with the changed modifiable part of the data, and verifying the signature using the first public key for the changers and the third public key for the changers of the actual delegator.

8. A non-transitory computer readable recording medium storing a program executable by the one or more computers to perform the signature verification method according to claim 7.

* * * * *